US010669046B2

(12) United States Patent
Palmer et al.

(10) Patent No.: US 10,669,046 B2
(45) Date of Patent: Jun. 2, 2020

(54) SYSTEMS AND METHODS FOR IMPROVING EFFICIENCY OF ELECTROANTIMAGNETIC LAUNCHERS

(71) Applicant: 8 Rivers Capital, LLC, Durham, NC (US)

(72) Inventors: Miles R. Palmer, Chapel Hill, NC (US); Cam Hosie, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 272 days.

(21) Appl. No.: 15/910,230

(22) Filed: Mar. 2, 2018

(65) Prior Publication Data

US 2018/0251237 A1  Sep. 6, 2018

Related U.S. Application Data

(60) Provisional application No. 62/465,989, filed on Mar. 2, 2017.

(51) Int. Cl.
| | | |
|---|---|---|
| *B64G 5/00* | (2006.01) | |
| *B64G 1/00* | (2006.01) | |
| *B64F 1/04* | (2006.01) | |
| *F41F 3/04* | (2006.01) | |
| *F42B 6/00* | (2006.01) | |
| *F41B 6/00* | (2006.01) | |

(52) U.S. Cl.
CPC .............. *B64G 1/002* (2013.01); *B64F 1/04* (2013.01); *B64G 5/00* (2013.01); *F41B 6/00* (2013.01); *F41F 3/0406* (2013.01); *F42B 6/006* (2013.01)

(58) Field of Classification Search
CPC ... B64G 1/002; B64G 5/00; B64F 1/04; F41B 6/00; F41B 6/003; F42B 6/006
USPC ........................................ 244/171.3
See application file for complete search history.

(56) References Cited

U.S. PATENT DOCUMENTS

| | | |
|---|---|---|
| 2,790,354 A | 4/1957 | Yoler |
| 3,016,693 A | 1/1962 | Jack et al. |
| 3,369,455 A | 2/1968 | Jones |
| 3,374,668 A | 3/1968 | Godfrey |
| 3,583,161 A | 6/1971 | Simms |
| 4,347,463 A | 8/1982 | Kemeny |
| 4,369,691 A | 1/1983 | Baehr, Jr. et al. |

(Continued)

FOREIGN PATENT DOCUMENTS

| | | |
|---|---|---|
| GB | 1 073 144 | 6/1967 |
| GB | 2 233 076 | 1/1991 |

(Continued)

OTHER PUBLICATIONS

Allam et al., "High Efficiency and Low cost of Electricity Generation from Fossil Fuels While Eliminating Atmosperic Emissions, Including Carbon Dioxide," *Energy Procedia*, 2012, pp. 1-12.

(Continued)

*Primary Examiner* — Christopher P Ellis
(74) *Attorney, Agent, or Firm* — Womble Bond Dickinson (US) LLP

(57) ABSTRACT

The present disclosure relates launch systems, launch vehicles for use with the launch system, and methods of launching articles utilizing the launch vehicle and/or the launch system. In particular, various improvements for electroantimagnetic launch systems, vehicles, and methods are provided.

21 Claims, 4 Drawing Sheets

(56) References Cited

U.S. PATENT DOCUMENTS

| | | | |
|---|---|---|---|
| 4,480,523 A | 11/1984 | Young et al. | |
| 4,577,461 A | 3/1986 | Cann | |
| 4,590,842 A * | 5/1986 | Goldstein | F41A 1/02 376/102 |
| 4,677,895 A | 7/1987 | Carlson et al. | |
| 4,715,261 A | 12/1987 | Goldstein | |
| 4,796,511 A | 1/1989 | Eyssa | |
| 4,821,509 A | 4/1989 | Burton et al. | |
| 4,957,035 A | 9/1990 | Eskam | |
| 4,967,637 A | 11/1990 | Löffler et al. | |
| 4,974,487 A | 12/1990 | Goldstein | |
| 5,012,719 A | 5/1991 | Goldstein | |
| 5,016,518 A * | 5/1991 | Kaplan | F41B 6/00 102/202.5 |
| 5,024,137 A | 6/1991 | Schroeder | |
| 5,033,355 A | 7/1991 | Goldstein | |
| 5,072,647 A | 12/1991 | Goldstein et al. | |
| 5,171,932 A | 12/1992 | McElroy | |
| 5,183,956 A | 2/1993 | Rosenberg | |
| 5,233,903 A | 8/1993 | Saphier | |
| 5,485,721 A | 1/1996 | Steenborg | |
| 5,640,843 A | 6/1997 | Aston | |
| 6,220,141 B1 * | 4/2001 | Fitter | A61M 5/30 89/8 |
| 6,311,926 B1 | 11/2001 | Powell | |
| 6,679,155 B1 * | 1/2004 | Yaschur | F41A 1/04 124/56 |
| 6,895,743 B1 | 5/2005 | McElheran | |
| 6,921,051 B2 | 7/2005 | Lopata et al. | |
| 6,993,898 B2 | 2/2006 | Parkin | |
| 7,246,483 B2 | 7/2007 | Minick et al. | |
| 7,775,148 B1 | 8/2010 | McDermott | |
| 8,746,120 B1 | 6/2014 | Nolting | |
| 9,273,943 B1 * | 3/2016 | Poulsen | F42B 10/00 |
| 9,772,157 B2 * | 9/2017 | Yoakam | F41A 21/28 |
| 10,132,578 B2 * | 11/2018 | Knowlen | F41A 1/02 |
| 2004/0139723 A1 | 7/2004 | Parkin | |
| 2004/0156400 A1 | 8/2004 | Caplan et al. | |
| 2011/0259230 A1 | 10/2011 | Sawka et al. | |
| 2012/0175457 A1 | 7/2012 | Hunter | |
| 2012/0187249 A1 | 7/2012 | Hunter et al. | |
| 2012/0227374 A1 | 9/2012 | Zegler | |
| 2014/0306065 A1 | 10/2014 | Palmer | |
| 2015/0175278 A1 | 6/2015 | Hunter | |
| 2015/0307213 A1 | 10/2015 | Hunter | |
| 2016/0368623 A1 * | 12/2016 | Palmer | B64G 1/402 |

FOREIGN PATENT DOCUMENTS

| | | |
|---|---|---|
| JP | H028695 | 1/1990 |
| JP | H0343678 | 2/1991 |
| JP | H0486496 | 3/1992 |
| JP | H05-322486 | 12/1993 |
| JP | H05320910 | 12/1993 |
| JP | H0610766 | 1/1994 |
| JP | H0646539 | 2/1994 |
| JP | H07133757 | 5/1995 |
| JP | H0874731 | 3/1996 |
| JP | H08273622 | 10/1996 |
| JP | 2001132542 | 5/2001 |
| JP | 2005042721 | 2/2005 |
| JP | 2007513308 | 5/2007 |
| JP | 2008512978 | 4/2008 |
| JP | 2008517199 | 5/2008 |
| JP | 2009083954 | 4/2009 |
| JP | 2009096441 | 5/2009 |
| JP | 2010275929 | 12/2010 |
| JP | 2011207401 | 10/2011 |
| JP | 2013536917 | 9/2013 |
| WO | WO 2005/054674 | 6/2005 |
| WO | WO 2008/010180 | 1/2008 |
| WO | WO 2011/038365 | 3/2011 |
| WO | WO 2012/030820 | 3/2012 |

OTHER PUBLICATIONS

Author Unknown, "The SHARP Gas Gun," *Energy & Technology Review*, Jul. 1993, pp. 1-12.

McNab, "Launch to Space With an Electromagnetic Railgun," *IEEE Transactions on Magnetics*, 2003, pp. 295-304, vol. 39, No. 1.

Palmer et al., "High Temperature Superconductor Applications in Electromagnetic Space Launch," *Progress in High Temperature Superonductivity*, vol. 8 Wolrld Scientific Publ., Teaneck, NJ, 1988, p. 168-173.

Palmer et al., Electromagnetic Space Launch: A Re-evaluation in Light of Current Technology and Launch Needs and Feasibility of a Near Term Demonstration, *IEEE Transactions on Magnetics*, vol. 25, No. 1, Jan. 1989, pp. 393-399.

Palmer et al. "A Revolution in Access to Space Through Spinoffs of SDI Technology," Keynote Paper, $5^{th}$ Symposium on Electromagnetic Launch Technology, Destin, Florida, Apr. 1990, *IEEE Transaction on Magnetics*, vol. 27, No. 1, Jan. 1991, p. 11-20.

Palmer, "Synergisrn in Research and Development Between Electromagnetic Guns and Spacecraft Electric Propulsion," *EIII Transactions on Magnetics*, 1993, vol. 29, No. 1. pp. 706-710.

Palmer, "Implications of Gun Launch to Space for Nanosatellite Architectures," *Proceedings of the International Conference on Integrated Micro/Nanotechnology for Space Applications*, Houston, Texas, Oct. 30, 1995, 6 pages.

Palmer, "Economics and Technology Issues for gun Launch to Space," *Space Technology International Forum*, 1996, Albuquerque, New Mexico, 6 pages.

Palmer, "Market, Cost, and Technical Factors Affecting Advanced Space Launch Technologies," $12^{th}$ *International Symposium on Electromagnetic Launch Technology*, Snow Bird, Utah, May 2005, 15 pages.

Palmer et al., "Component and Subscale Testing in Support of the Design of a Battery Power Supply for the Electromagnetic Gun Research Facility," Presented Paper, IEEE Pulsed Power Conference, Washington, D.C., Jun. 29, 1987, pp. 46-49.

Palmer, "Midterm to Far Term Applications of Electromagnetic Guns and Associated Power Technology," Keynote paper, Applications Panel, $6^{th}$ Symposium on Electromagnetic Launch Technology, Austin, Texas, Apr. 1992, published IEEE Transactions on Magnetics, 29(1) Jan. 1993, p. 345-348.

Palmer, "Motivation for a Near Term Gun Launch to Space Demonstration and a Variable Inductance Power Supply Concept to Minimize Initial Demonstration Costs," IEEE Transactions on Magnetics, vol. 29(1), Jan. 1993, p. 478-483.

Turman et al., "Co-Axial Geometry Electromagnetic Launch to Space," *AIAA Paper 94-4626, AIAA Apace Programs and Technologies Conference*, Hunsville, Alabama, Sep. 29, 1994, 15 pages. http://arc.aiaa.org, DOI No. 10.2514/6.1994-4626

Walls et al, "Application of Electromagnetic Guns to Future Naval Platforms," *IEEE Transactions on Magnetics*, 1999, pp. 262-267, vol. 35, No. 1.

* cited by examiner

SYSTEMS AND METHODS FOR IMPROVING EFFICIENCY OF ELECTROANTIMAGNETIC LAUNCHERS

CROSS-REFERENCE TO RELATED APPLICATIONS

The present application claims priority to U.S. Provisional Patent Application No. 62/465,989, filed Mar. 2, 2017, the disclosure of which is incorporated herein by reference.

FIELD OF THE DISCLOSURE

The present disclosure relates to systems, methods, and apparatuses for launch of various items. More particularly, the present disclosure provides improvements in efficiency for electroantimagnetic launch systems and methods.

BACKGROUND

Electroantimagnetic (EAM) launch systems have been previously proposed for relatively low cost delivery of various items from one location to another via terrestrial and/or space flight. See, for example, U.S. Pat. Pub. No. 2014/0306065 to Palmer et al. While such EAM launch systems can provide the desired results, there remains a need in the field for improvements to the efficiency of such systems and methods of implementing such systems.

SUMMARY OF THE DISCLOSURE

In one or more embodiments, the present disclosure can provide methods for improving the efficiency of an electroantimagnetic launch system. For example, such methods can comprise the following steps: accelerating a launch vehicle through a launch tube by conducting electrical current from a power source through conductors positioned in the launch tube to electrical contacts on the launch vehicle so as to power a propulsion system of the launch vehicle; and substantially preventing flow of electrical current in the launch tube other than between the launch tube conductors and the launch vehicle electrical contacts. In further embodiments, such methods can be defined in relation to one or more of the following statements, which can be combined in any number and order.

The launch tube can comprise a starting end and an exit end, the power source can be positioned proximate the exit end of the launch tube so as to deliver the electrical current from the exit end toward the starting end, and the launch tube can comprise a plurality of elements that sequentially terminate delivery of the electrical current rearward of the launch vehicle as the launch vehicle accelerates through the launch tube.

The plurality of elements that sequentially terminate delivery of the electrical current rearward of the launch vehicle can be selected from the group consisting of solid state switches, explosive switches, fuses, and combinations thereof.

The plurality of elements that sequentially terminate delivery of the electrical current rearward of the launch vehicle can be defined by one or more of the following configurations: time-based switching; controlled by a defined computer algorithm; mechanically triggered; optically triggered.

The method can comprise forming a sheath of ionization quenching gas that is effectively positioned between in a space between the launch tube and the launch vehicle as the launch vehicle accelerates through the launch tube.

A sheath of ionization quenching gas can be formed substantially around a circumference of the launch vehicle by venting of the gas from the launch vehicle.

A sheath of ionization quenching gas can be formed substantially around a circumference of the launch tube by venting of the gas from the launch tube.

Venting of ionization quenching gas at any given section of the launch tube can begin prior to the launch vehicle accelerating past said given section of the launch tube, and the venting of the ionization quenching gas can terminate after the launch vehicle has accelerated past said given section of the launch tube.

The method can comprise generating a magnetic force following the launch vehicle as the launch vehicle accelerates through the launch tube, said magnetic force being effective to force any electrical current forming behind the accelerating launch vehicle to move forward and merge with the electrical current conducted through the conductors in the launch tube to the electrical contacts on the launch vehicle.

The launch tube can provide an inductance gradient that exceeds the minimal inductance gradient required for operation of the launch tube.

The method can comprise utilizing a plurality of power sources spaced along the launch tube and configured to separately conduct electrical current to the launch tube only in defined sections of the launch tube, and each of the plurality of power sources can be activated for power delivery only during the time that the launch vehicle accelerates past the defined section of the launch tube powered by the respective power source.

In one or more embodiments, the present disclosure likewise can provide an improved launch system, particularly a system configured for electroantimagnetic launch of a vehicle. For example, such launch system can comprise the following elements: a launch tube including a power source and conductors configured for conducting electrical current from the power source; a launch vehicle including a propulsion system configured for accelerating the launch vehicle through the launch tube and electrical contacts configured for transferring the electrical current from the conductors of the launch tube to the propulsion system; wherein the launch system is configured to substantially prevent flow of electrical current in the launch tube other than between the launch tube conductors and the launch vehicle electrical contacts. In further embodiments, such systems can be defined in relation to one or more of the following statements, which can be combined in any number and order.

The launch tube can comprise a starting end and an exit end; the power source can be positioned proximate the exit end of the launch tube and configured to deliver the electrical current from the exit end toward the starting end; and the launch tube can comprise a plurality of elements configured to sequentially terminate delivery of the electrical current rearward of the launch vehicle as the launch vehicle accelerates through the launch tube.

The plurality of elements configured to sequentially terminate delivery of the electrical current rearward of the launch vehicle can be selected from the group consisting of solid state switches, explosive switches, fuses, and combinations thereof.

The plurality of elements configured to sequentially terminate delivery of the electrical current rearward of the launch vehicle can be defined by one or more of the following configurations: time-based switching; controlled by a defined computer algorithm; mechanically triggered; optically triggered.

The launch system can comprise a source of an ionization quenching gas and one or more vents configured to emit the ionization quenching gas in a space between the launch tube and the launch vehicle.

One or more vents for emitting ionization quenching gas can be included on the launch vehicle.

One or more vents for emitting ionization quenching gas can be included on the launch tube.

A plurality of vents for emitting ionization quenching gas can be positioned along the launch tube, and a control element can be included and configured to open and close the vents sequentially in combination with passage of the launch vehicle thereby.

The launch tube can be configured to have an inductance gradient that exceeds the minimal inductance gradient required for operation of the launch tube.

The launch system can comprise a plurality of power sources spaced along the launch tube and configured to separately conduct electrical current to the launch tube only in defined sections of the launch tube, and each of the plurality of power sources can be configured to be active for power delivery only when the launch vehicle is in the defined section of the launch tube powered by the respective power source.

BRIEF SUMMARY OF THE FIGURES

Figure 1:
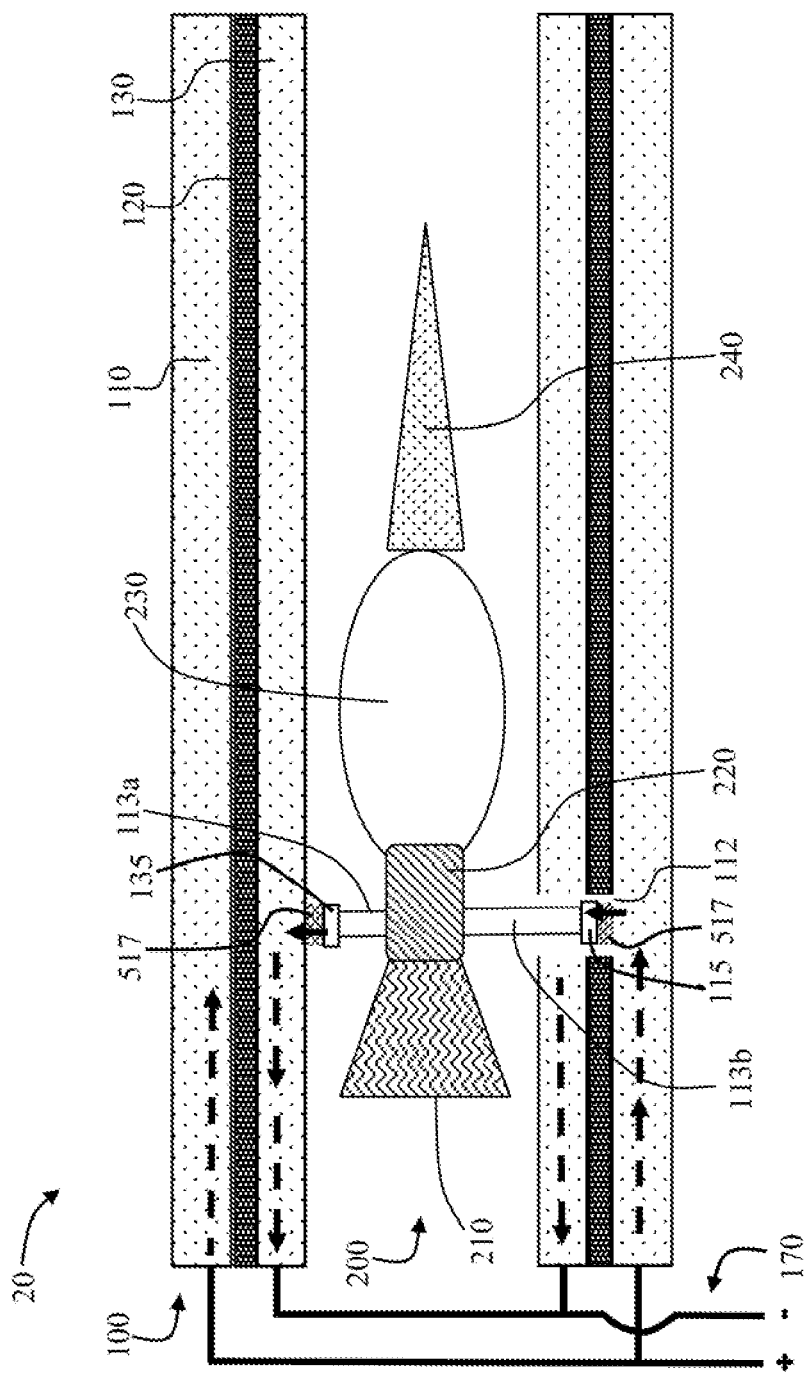
Figure 2:
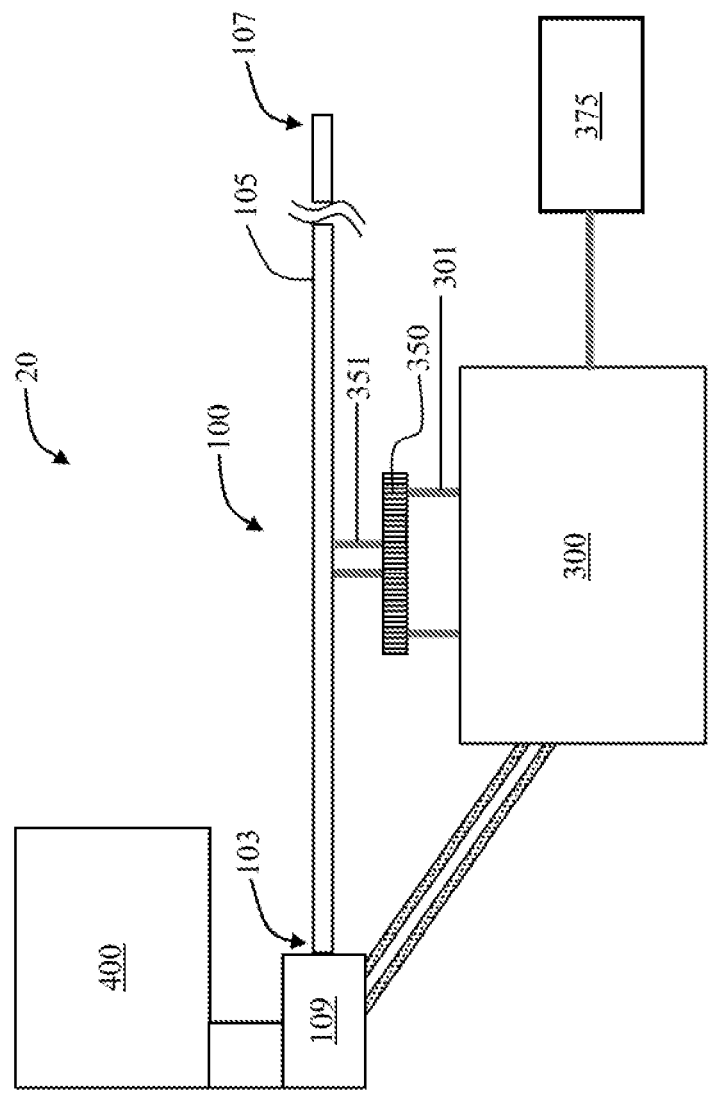
Figure 3:
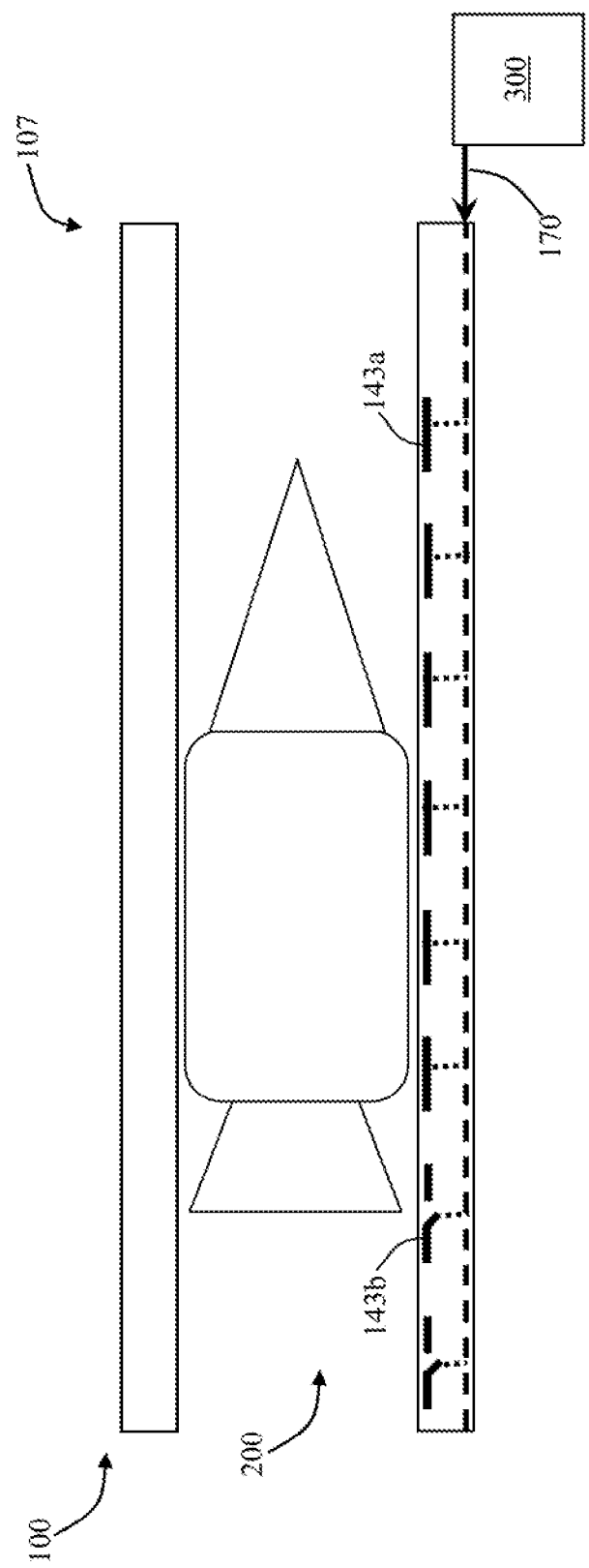
Figure 4:
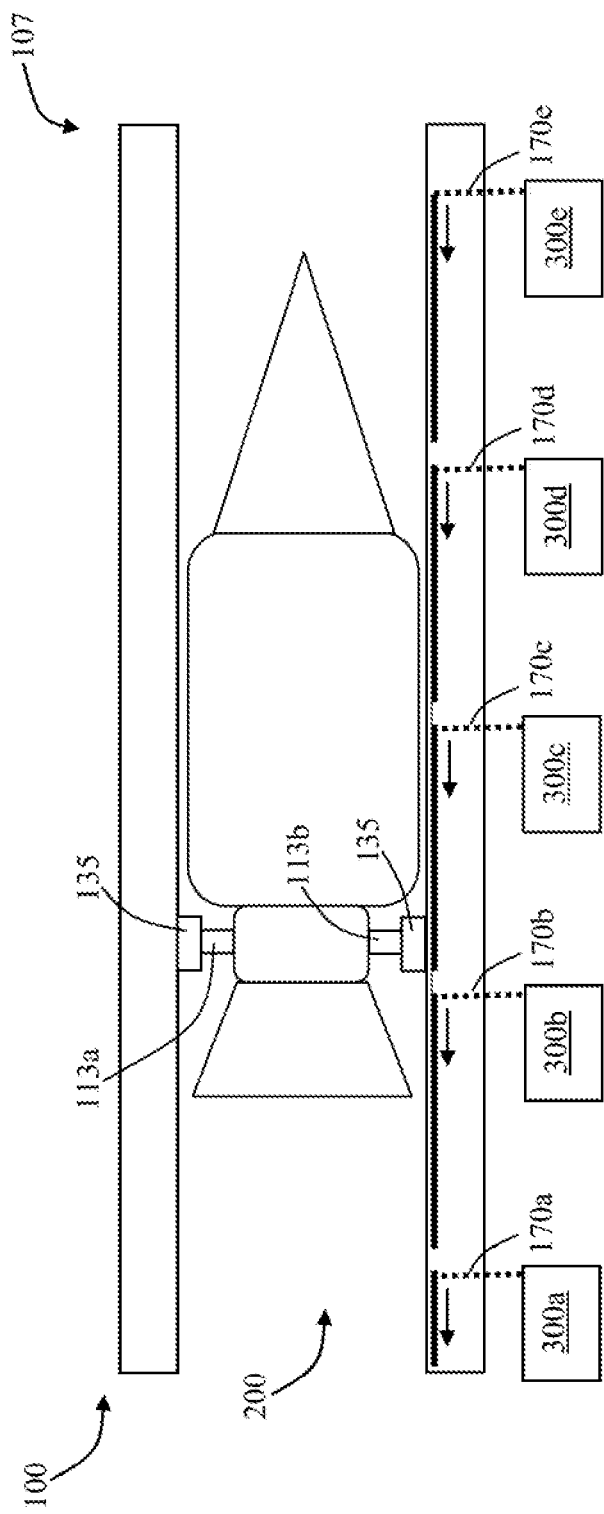

Having thus described the present disclosure in the foregoing general terms, reference will now be made to accompanying drawings, which are not necessarily drawn to scale, and wherein:

FIG. 1 is a side sectional view of a launch system according to an exemplary embodiment of the present disclosure wherein a launch vehicle is positioned within an electrically conductive launch tube;

FIG. 2 is a schematic of a launch system according to an exemplary embodiment of the present disclosure showing a launch tube in connection with an electrical energy source;

FIG. 3 is a side sectional view of a launch system according to an exemplary embodiment of the present disclosure wherein a launch vehicle is positioned within an electrically conductive launch tube including a plurality of independently openable and closable switches for allowing or disallowing delivery of electrical current to defined segments of the launch tube; and FIG. 4 is a side sectional view of a launch system according to an exemplary embodiment of the present disclosure wherein a launch vehicle is positioned within an electrically conductive launch tube including a plurality of independent electrical energy sources that can separately deliver electrical current to defined segments of the launch tube.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

In one or more embodiments, the present disclosure provides systems and methods useful for electroantimagnetic (EAM) launch of a vehicle, projectile, or any device or object desirable for terrestrial or space flight between locations. EAM launchers, EAM launch systems, and methods for EAM launching are described in U.S. Pat. Pub. No. 2014/0306065 to Palmer et al., the disclosure of which is incorporated herein by reference. As disclosed therein, an EAM launch system can comprise a launch tube in electrical connection with an electrical energy source so as to provide electrical energy to a launcher that may comprise one or more of a propellant source, an electrical heater for heating the propellant from the propellant source, sliding contacts in electrical contact with the electrical heater and in electrical contact with the launch tube, an expansion nozzle in fluid communication with the electrical heater and adapted for discharge of one of more heated propellant or a component thereof, and a payload in mechanical connection with one or more of the further components of the launcher. In such launch systems, power can be provided to an electric rocket from a stationary power supply via one or more conductors in an evacuated tube. The system can utilize a relatively lightweight engine with a high thrust to weight ratio that requires only short thrust durations to achieve launch.

An EAM launch system differs from electromagnetic (EM) launchers in that it is desirable to minimize any magnetic field generated in the launch tube. Thus, rather than relying upon induced magnetic fields for propulsion (as in EM launchers), an EAM launcher utilizes a separate propulsion system and seeks to minimize magnetic field production in order to avoid magnetic field energy losses and magnetic field forces on the electrical contacts used with the launch vehicle. One means for minimizing local currents and magnetic field forces that can disrupt the electrical contacts can relate to the use of multiple power supplies positioned along the launch tube. The present disclosure can improve upon such means by providing multiple options for substantially preventing any undesirable current conduction between the launch tube conductors in areas other than the electrical contacts of the launch vehicle. Since any current flow extraneous to the launch vehicle electrical contacts can have the result of decreasing launcher efficiency and increasing the potential for damage to the launch tube, it is desirable to limit current flow in the launch tube to substantially only the electrical contacts of the launch vehicle.

The systems and methods described herein can be applied to any EAM launch vehicle, EAM launch system, and EAM launch method, including those described in U.S. Pat. No. 20014/0306065, as noted above. For example, the present systems and methods may be utilized with a launch system 20 as shown in FIG. 1, wherein a launch vehicle 200 is positioned within a launch tube 100. The launch tube 100 comprises a plurality of concentric, electrically conductive tubes that are separated by one or more insulating layers. Alternatively, the launch tube can comprise a single, multi-layer tube comprising a plurality of conductive layers separated by one or more insulating layers. As illustrated in FIG. 1, the launch tube 100 comprises an outer conductive tube 110 spaced apart from an inner conductive tube 130 and separated by an insulator 120. The outer conductive tube 110 and the inner conductive tuber 130 can be formed of any suitable, conductive material, such as a metal or metal alloy. In some embodiments, the conductive tube walls can comprise layers of two or more different materials. As exemplary embodiments, one or both of the inner conductive tube and the outer conductive tube can comprise steel, aluminum, or an aluminum alloy. In preferred embodiments, the innermost layer of one or both of the inner conductive tube and the outer conductive tube can comprise a high temperature wear resistant conductive material such as tungsten, rhenium, or hardened copper.

The walls of the outer and inner conductive tubes can have one or more slotted tracks of varying geometries that are adapted for receiving one or more sliding contacts. The cross-section of FIG. 1 passes through a slotted track 112 in the inner conductive tube 130 and the insulator 120 (with a portion of the inner tube and insulator cut away to reveal the sliding contact in the slotted track). The slotted track 112 provides for an electrical connection of the outer conductive tube 110 and an outer electrical contact 115 configured to slide along the launch tube. An inner sliding electrical contact 135 is also illustrated in electrical connection with the inner conductive tube 130. The slotted tracks can be effective to facilitate proper contact between the tubes and the electrical contacts, to prevent or substantially reduce arcing between the tube conductors, and also serve to align the launch vehicle 200 and substantially prevent rotating thereof within the launch tube 100. Aligning arms 113a and 113b can be in physical contact with the sliding electrical contacts 115 and 135, respectively, and also be in physical contact with the electrical heater 220. The aligning arms preferably comprise a high strength, rigid, conductive material, such as steel, aluminum, or another metal or metal alloy that can include an insulative layer, if desired. The sliding electrical contacts can define an arcing sliding contact (e.g., a plasma brush) with the conductive tube walls with only a minimal voltage drop. The arc may be contained via mechanical containment, such as using a sliding insulating perimeter. In other embodiments, the arc may be contained via magnetic forces, which can be generated by the current transferring from the contact. In particular, the contacts may define a current loop adapted to generate the magnetic forces. In some embodiments, the magnetic forces can be generated by a self-contained power source or object that may be present on the launcher. As an example, the magnetic forces can be generated by a magnet, which may be a superconducting magnet. In particular embodiments, the sliding contact pads may be configured to function as plasma brushes.

The launcher 200 comprises a payload 240, a propellant tank 230, and electrical heater 220, and an expansion nozzle 210. In use, as shown in FIG. 1, electrical energy passes from an electrical energy source (see element 300 in FIG. 2) via electrical lines 170. As illustrated, electrical energy passes from the electrical lines 170 to the outer conductive tube 110, passes to the sliding contact 115 via the plasma arc contact 517 and through the aligning arm 113b to the electrical heater 220. The electrical path is completed by passage from the electrical heater 220 through the aligning arm 113a and the sliding contact 135 to the inner conductive tube 130 via the plasma arc contact 517. Propellant from the propellant tank 230 is heated in the electrical heater 220 and expanded through the nozzle 210 to accelerate the launcher 200 through the launch tube 100. In such embodiments, propulsion can be characterized as proceeding via electric rocket propulsion powered by plasma-mediated electrical current conduction. The launcher 200 also can be configured for induced passage of the propellant from the propellant tank 230 to the electrical heater 220. Pumping propellant can require a significant power input—e.g., in the range of 50 MW or about 70,000 HP. Preferably, the power for induced passage of propellant can be provided in a very lightweight form. For example, the propellant tank 230 can be appropriately pressurized. Rail power can be used for an electric heater positioned interior to the propellant tank 230 to provide pressure. In some embodiments, a linear air core electromagnetic coil driven by rail power may be used to drive a piston inside of the propellant tank 230. In further embodiments, a rail powered air core electric motor and turbine may be used for pumping propellant from the propellant tank 230 to the electrical heater 220.

Plasma-mediated conduction occurs at the plasma arc contact 517 between the conductive tubes 110 and 130 and the sliding contacts 115 and 135. In some embodiments, the sliding contacts 115 and 135 are initially in direct physical contact with the outer conductive tube 110 and the inner conductive tube 130, respectively. A defined contact force can be applied so that the sliding contact is held against the stationary tube. The contact surface of the sliding contact can be configured to vaporize as the sliding contact moves along the conductive tube, and the thus vaporized material can form the plasma arc contact 517 between the sliding contact(s) and the conductive tube(s). Preferably, the vaporization of the contact surface stabilizes when a defined gap between the contact surface and the conductive tube is achieved. The defined gap can be about 0.1 to about 50 microns. A small gap in this range is beneficial to achieve a thin layer of plasma that has a desirably low voltage that can minimize losses. To this end, it is preferable for the defined gap to be less than 5000 microns, less than 1000 microns, less than 500 microns, or less than 100 microns (with a lower gap size be about 0.1 microns). Viscous friction interaction at the plasma arc contact can continuously vaporize material from the tube to replenish material lost due to frictional shear on the moving sliding contact.

In some embodiments, the sliding contacts of the launch vehicle can be formed of materials exhibiting a higher level of hardness than the materials used to form the launch tube. Potential damage to the launch tube is inconsequential in light of the configuration described herein because of the implementation of an automated high speed refurbishment system whereby relatively softer launch tube materials can be used to sacrificially cushion the passage of the launch vehicle down the launch tube.

Any damage to the launch tube, whether unintended or related to the sacrificial cushioning effect noted above, can be identified and repaired utilizing an automated, high speed measurement and refurbishment system. The present systems and methods benefit from the ability to provide rapid, repetitive launches. To facilitate this characteristic, a high speed automated diagnostic and refurbishment system can be configured to traverse the launch tube, measure the integrity of the launch tube, and implement repairs as necessary between each launch or every several launches. In an exemplary embodiment, the system can comprise three independent sections. The first and third sections can include acceleration sensors, vibration sensors, sliding pad electrical resistance pickups, high speed profilometers, and imaging systems. The second section can include spray or other known deposition systems for depositing electrically conductive filler material on the rails and electrically insulating material on the insulators. The first section can be configured to diagnose and quantify any defects, the second section can then implement any repairs that are identified as being necessary by the first section, and the third section can be configured to verify that repairs made by the second section return the launch tube to the conditions required for launch within a defined tolerance range.

Referring to FIG. 2, an electrical energy source 300 can be provided to supply electrical energy to the launch tube 100, which comprises a starting end 103, a main launch tube section 105, and a launch tube exit end 107. The energy source 300 can be recharged periodically as necessary, such as from the electrical grid or a dedicated generation system 375. In certain embodiments, the electrical energy source 300 can comprise a battery bank. For example, a series parallel combination of lead acid batteries (e.g., automotive batteries) may be used. Any further battery or suite of batteries suitable for providing electrical energy on demand likewise may be used. In particular embodiments, an inductor 350 can be interposed between the battery bank and the launch tube such that the battery bank charges the inductor while the inductor is in a charging state. Thereafter, the inductor 350 can be switched to a discharging state wherein the inductor discharges into the launch tube. In use, the launch vehicle 200 is initially positioned inside the launch tube 100 near the staging station 109 at the starting end 103 of the launch tube. The launch system 20 can comprise additional elements as illustrated in FIG. 2, such as the payload preparation and launch operations building 400 and the grid connection or generating system 375. Briefly, in use, electrical energy is transferred from the pre-charged electrical energy source 300 via conduit 301 to the inductor 350 and then through conduit 351 to the launch tube 100. While the inductor may be present, the disclosure also encompasses embodiments wherein an inductor is expressly excluded from use. For example, power sources such as very high rate liquid batteries can be suitable to directly power the launcher and eliminate any need for an inductor.

The conduit 351 can correlate to or be interconnected with the electrical lines 170 shown in FIG. 1. The electrical energy passes through the conductive launch tube to the electrical heater 220 via various mechanisms (e.g., using sliding contacts, plasma arc transfer, passage through the conductive tubes, and passage through the launch tube bore). Propellant from the propellant tank 230 is heated in the electrical heater 220 and exits the expansion nozzle 210 to accelerate the launch vehicle 200 down the launch tube 100. In addition to the foregoing, an EAM launch system and/or launch vehicle can include any of the further elements described in U.S. Pat. Pub. No. 2014/0306065, as noted previously.

The launch tube 100 can be positioned substantially horizontally. This is a sharp contrast to known "gun" or catapult systems that require a significantly inclined launch tube in order for the payload to be launched at the highest angle possible to quickly escape the atmosphere. In the present disclosure, the launch tube can be at an angle of 0° to about 15°, preferably 0° to about 10° or 0° to about 5° relative to the horizontal plane. In some embodiments, a hypersonic glide vehicle can be used to pitch up the launcher and attain a desired angle of ascent through the atmosphere after a substantially horizontal launch (i.e., at an angle as noted above).

In one or more embodiments, a launch tube exit particularly is positioned to be below ground level. For example, the launch tube may be positioned below ground in a location where the exit is proximate a cliff face or the like. Placing the exit from the evacuated launch tube into the air at a location below ground can be combined with providing a relatively narrow or closely dimensioned launch opening. A closely dimensioned launch opening can be defined as an opening with dimensions that exceed the outer dimensions of the launcher at its largest point by no more than 20%, no more than 15%, no more than 10%, or no more than 5%. Utilizing a closely dimensioned launch opening can require the launcher to "thread the needle" through the opening in order to reach open air, and this ensures that a launcher reaching open air has a heat shield and/or guidance system that is operating precisely in the proper manner. Thus, operating parameters outside of the required state will result in destruction of the launcher before reaching open air outside of the underground launch complex, and this can significantly improve safety assurances for the launch process.

In some embodiments, the launcher can be configured to exhibit neutral or negative aero stability. As such, active stabilization must occur continuously during launch to avoid pitch divergence and accompanying vehicle destruction. This requirement for continuous stabilization likewise can dramatically improve safety assurances of the launch process.

Safety can be further increased through implementation of a launcher exit failsafe monitoring system. For example, the launch system can include software or similar elements that continuously deliver shutdown instructions; however, such instructions are actively inhibited so long as defined parameters are maintained. The defined parameters can include any one or more parameters that are indicative of a properly functioning system. For example, the launch vehicle telemetry system can be configured to transmit signals indicating proper maintenance of launch vehicle integrity and/or indicating that the launch process is proceeding according to the pre-planned profile. The system can include transmission of the defined parameters at a defined frequency (e.g., in the range of 1 millisecond to 100 milliseconds). If the launch vehicle telemetry system fails to transmit a single required signal of proper functioning or fails to transmit a certain number of required signals of proper functioning, the active inhibition of the shutdown instructions will cease, and shutdown of the launch will be initiated.

Any event leading to a sudden failure of the launch process can lead to a propagating catastrophic destruction of a significantly long segment of the launch tube. Even in a situation where the launch process is shut down by a main system controller, the speed of the launcher through the launch tube can lead to varying levels of damage along significant portions of the launch tube. In some embodiments, this can be at least partially prevented with the use of powerful, high explosives periodically placed along the launch tube that can be actuated at the proper locations to very rapidly disrupt the structural integrity of the launch vehicle, thus causing the launch vehicle to self-destruct in a very short time and distance and thereby limit damage of the launch system to a short distance rather than allowing damage over a long distance of the launch tube. In further embodiments, a high power laser positioned at the launch tube exit (or a series of lasers positioned along the length of the launch tube) can be directed down the launch tube to the on-coming launch vehicle. Under conditions necessitating shutdown of the launch or conditions surrounding a catastrophic launch failure, the laser(s) can be utilized to very rapidly disrupt the structural integrity of the launch vehicle, causing it to self-destruct in a very short time and distance and thereby limit damage of the launch tube to a short distance rather than allowing damage over a long distance of the launch tube.

In addition to the foregoing, the present system can include a free flight laser destruction system. Certain types of failures occurring launch may damage one or more of the further failsafe mechanisms noted herein. Likewise, failures may occur after exit of the launch vehicle from the launch tube. Accordingly, in some embodiments, the present system can include a high power laser system that is configured to destroy the launch vehicle in flight.

The methods and systems of the present disclosure are particularly useful for improving efficiency of EAM launch systems and also preventing damage to EAM system and vehicles arising from undesired current conduction within the launch tube separate from the current flow into the electrical contacts of the launch vehicle. Accordingly, in one or more embodiments, a method for improving efficiency of an EAM launch system can comprise the following steps: accelerating a launch vehicle through a launch tube by conducting electrical current from a power source through conductors positioned in the launch tube to electrical contacts on the launch vehicle so as to power a propulsion system of the launch vehicle; and substantially preventing flow of electrical current in the launch tube other than between the launch tube conductors and the launch vehicle electrical contacts. Substantially preventing flow of electrical current in this regard can be achieved through various means.

In one or more embodiments, flow of unwanted electrical current can be substantially prevented by limiting or preventing electrical output from the conductive tubes behind the launch vehicle. The exhaust exiting the launch vehicle can be at a very high temperature, which high temperature is to be expected when providing propulsion via an arcjet, a high performance resistojet rocket motor, or the like. Such exhaust can exhibit ionization sufficient to conduct current between the launch tube conductors in the area behind the launch vehicle as it accelerates down the launch tube. To substantially prevent such unwanted flow of electrical current, it can be useful to provide a launch system as described herein to have a specific configuration.

A launch system according to embodiments of the present disclosure can comprise the following: a launch tube including a power source and conductors configured for conducting electrical current from the power source; and a launch vehicle including a propulsion system configured for accelerating the launch vehicle through the launch tube and electrical contacts configured for transferring the electrical current from the conductors of the launch tube to the propulsion system. In some embodiments, it can be beneficial to configure the launch system such that the power source is positioned proximate the exit end of the launch tube and is configured to deliver the electrical current from the exit end toward the starting end. Alternatively or additionally, a power source may also be present proximate the starting end of the launch tube and/or at a plurality of locations along the length of the launch tube.

In one or more embodiments, the launch tube can include a plurality of elements configured to sequentially terminate delivery of the electrical current rearward of the launch vehicle as the launch vehicle accelerates through the launch tube. Terminating delivery of the electrical current can be achieved via any suitable method, such as utilizing solid state switches, explosive switches, fuses, and the like. The switches may be time-based, may be otherwise controlled by a defined computer algorithm, or may be triggered expressly via the passage of the launch vehicle (e.g., by tripping a mechanical or optical trigger or the like). Turning to FIG. 3, for example, the launch tube 100 includes an electrical energy source 300 proximate the exit end 107 of the launch tube that provides electrical current via an electrical line 170 flowing the opposite directing in which the launch vehicle 200 accelerates through the launch tube (i.e., from the exit end toward the starting end). The launch tube (which is shown only in part for simplicity) includes a plurality of electrical switches 143 and, as illustrated, forward from the launch vehicle 200, closed switches 143a are configured for delivery of electrical current to the launch tube 100 (and thus to the launch vehicle) and, rearward from the launch vehicle, open switches 143b are configured to prevent delivery of electrical current through the launch tube. The switches (or other equivalent elements) can be configured to sequentially terminate delivery of the electrical current rearward of the launch vehicle as the launch vehicle accelerates through the launch tube.

In one or more embodiments, flow of unwanted electrical current can be substantially prevented by providing a current flow barrier between the launch tube and the launch vehicle. In particular, one or both of the launch tube and the launch vehicle can include a source of an ionization quenching gas and one or more vents configured to emit the ionization quenching gas in a space between the launch tube and the launch vehicle. For example, the launch vehicle may include a source of hydrogen gas for use as a propellant, and a portion of the hydrogen gas may be vented as the ionization quenching gas. Other gases may also be used. In embodiments wherein the gas is vented from the launch vehicle, vents may be included along substantially the entire length of the launch vehicle or at discrete positions (e.g., at the front and/or rear of the launch vehicle). Of course, the launch vehicle may include any necessary pumps, valves, piping, and the like necessary to provide the gas to the desired location at the desired time, rate, and concentration. Such additional elements may also be present in the launch tube in order to vent gas therefrom. In some embodiments, the sheath of ionization quenching gas can be formed substantially around a circumference of the launch vehicle by venting of the gas from the launch vehicle. In other embodiments, the sheath of ionization quenching gas can be formed substantially around a circumference of the launch tube by venting of the gas from the launch tube. Similar to the switches illustrated in FIG. 3, a plurality of vents may likewise be positioned along the length of the launch tube, and the gas may be vented according to any desired pattern (e.g., venting along the entire length of the launch tube for the duration of the acceleration of the launch vehicle through the launch tube; venting forward of the launch vehicle that is terminated after passage of the launch vehicle; venting only rearward of the launch vehicle; venting immediately before passage of the launch vehicle and termination at any time after passage of the launch vehicle; or the like). In particular embodiments, venting of ionization quenching gas from any given section of the launch tube can begin prior to the launch vehicle accelerating past said given section of the launch tube, and the venting of the ionization quenching gas can terminate after the launch vehicle has accelerated past the given section of the launch tube.

While it is known in the art to utilize gas injectors and the like as plasma generators to facilitate thrust, the present disclosure utilizes the quenching gas to control a localized plasma and not accelerate plasma to high velocities by moving plasma according to various electric fields. Known systems and methods require movement of formed plasma away from the formation site in order to achieve acceleration. According to the present disclosure, however, quenching gases are utilized to ensure localization of the plasma in proximity to the plasma arc contact between the conductive tubes and the sliding contacts and to ensure that the generated plasma does not significantly migrate away from the plasma arc contact. Accordingly, in some embodiments, the present system can be configured to substantially avoid forces due to electric or magnetic fields by making such fields substantially close to zero and then to move plasma by gas dynamic forces.

In some embodiments, flow of unwanted electrical current can be substantially prevented by generating a magnetic force following the launch vehicle as the launch vehicle accelerates through the launch tube. In particular, the magnetic force can be effective to force any electrical current forming behind the accelerating launch vehicle to move forward and merge with the electrical current conducted through the conductors in the launch tube to the electrical contacts on the launch vehicle. As noted above, the launch vehicle can produce a very high temperature exhaust stream within the launch tube that is sufficient to conduct current between the launch tube conductors behind the accelerating launch vehicle. The produced electrical current can be forced forward in the launch tube by application of sufficient magnetic force. One exemplary method for achieving such force is through control of the inductance gradient in the launch tube.

Where a typical EM launcher seeks to increase inductance per unit length to increase efficiency, an EAM launcher (such as utilized according to the present disclosure) can maximize efficiency by minimizing inductance. This can be achieved, for example, by control of the geometry of the launch system. In particular, inductance per unit length of the launch tube can vary based upon the ratio of the outer radius to the inner radius for the launch tube (i.e., the ratio of the radius of the outer tube to the radius of the inner tube). Inductance can decrease as the ratio decreases. Thus, it can be desirable to provide the launch tube with a low ratio— i.e., a minimized total thickness for any space existing between the walls of the conductive launch tube. Likewise, the efficiency of an EAM launcher can increase as the ratio of the outer to inner radius for the launch tube decreases. Thus, it can be desirable to approach a ratio that is as close to 1 as possible (limited only by the necessary thickness of the conductors for carrying current and the thickness of insulators present to prevent high voltage breakdown between the conductive tubes). In this manner, one can identify the minimal inductance gradient provided in the launch system so as to maximize efficiency. In some embodiments, however, the launch system can be configured to provide an inductance gradient that is greater than this minimal gradient required for operation of the launch tube. For example, the inductance gradient can be about 1% to about 20% greater than the minimal gradient calculated for maximum efficiency.

To form the magnetic field, electrical power delivery can proceed from the starting end of the launch tube as illustrated in FIG. 1. As any ionization is sufficiently generated to conduct electrical current behind the accelerating launch vehicle, the fractionally larger than necessary inductance gradient can effectively generate a magnetic force on the electrical current flow behind the launch vehicle. The magnetic force can be calibrated to the necessary range by control of the inductance gradient as described above so that the electrical current flow behind the accelerating launch vehicle is effectively pushed forward to substantially merge with the flow of electrical current into the launch vehicle electrical contacts. In this manner, the extraneously generated electrical current can be directed through the electrical contacts and effectively reduce or eliminate the otherwise adverse effects of the undesired electrical current flow in the launch tube.

In some embodiments, flow of unwanted electrical current can be substantially prevented by increasing the number of power supplies for the launch tube and effectively separating the circuits associated with the individual power supplies. Turning to FIG. 4, for example, the launch tube 100 includes a plurality of electrical energy sources (300a-300e) space along the length of the launch tube that each separately provides electrical current via electrical lines (170a-170e) flowing the opposite directing in which the launch vehicle 200 accelerates through the launch tube (i.e., from the exit end toward the starting end). The respective electrical energy sources and electrical lines can form a plurality of individual and separate electrical circuits whereby electrical current only flows through the launch tube in any specific section having its specific electrical energy source activated. In use, since each of the separate electrical energy sources is configured to separately conduct electrical current to the launch tube only in its respectively defined section of the launch tube, each of the plurality of power sources can be activated for power delivery only during the time that the launch vehicle accelerates past the defined section of the launch tube powered by the respective power source. For example, as illustrated in FIG. 4, given the position of the launch vehicle 200 in the launch tube 100, electrical energy sources 300a and 300b may be inactive since the electrical contacts 135 of the aligning arms 113a and 113b have already accelerated past the sections of the launch tube 100 wherein electrical energy from these respective electrical energy sources is delivered via electrical lines 170a and 170b. Similarly, electrical energy sources 300d and 300e optionally may be inactive since the electrical contacts 135 of the aligning arms 113a and 113b have not yet reached the sections of the launch tube 100 wherein electrical energy from these respective electrical energy sources is delivered via electrical lines 170d and 170e. Electrical energy source 300c, however, can be active to deliver electrical current via electrical line 170 to the section of the launch tube 100 in which the electrical contacts 135 of the launch vehicle 200 are presently positioned.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for improving efficiency of an electroantimagnetic launch system, the method comprising:
   accelerating a launch vehicle through a launch tube by conducting electrical current from a power source through conductors positioned in the launch tube to electrical contacts on the launch vehicle so as to power a propulsion system of the launch vehicle; and
   substantially preventing flow of electrical current in the launch tube other than between the launch tube conductors and the launch vehicle electrical contacts.

2. The method of claim 1, wherein the launch tube comprises a starting end and an exit end, wherein the power source is positioned proximate the exit end of the launch tube so as to deliver the electrical current from the exit end toward the starting end, and wherein the launch tube comprises a plurality of elements that sequentially terminate delivery of the electrical current rearward of the launch vehicle as the launch vehicle accelerates through the launch tube.

3. The method of claim 2, wherein the plurality of elements that sequentially terminate delivery of the electrical current rearward of the launch vehicle are selected from the group consisting of solid state switches, explosive switches, fuses, and combinations thereof.

4. The method of claim 2, wherein the plurality of elements that sequentially terminate delivery of the electrical current rearward of the launch vehicle are defined by one or more of the following configurations: time-based switching; controlled by a defined computer algorithm; mechanically triggered; optically triggered.

5. The method of claim 1, comprising forming a sheath of ionization quenching gas that is effectively positioned between in a space between the launch tube and the launch vehicle as the launch vehicle accelerates through the launch tube.

6. The method of claim 5, wherein the sheath of ionization quenching gas is formed substantially around a circumference of the launch vehicle by venting of the gas from the launch vehicle.

7. The method of claim 5, wherein the sheath of ionization quenching gas is formed substantially around a circumference of the launch tube by venting of the gas from the launch tube.

8. The method of claim 7, wherein venting of ionization quenching gas at any given section of the launch tube begins prior to the launch vehicle accelerating past said given section of the launch tube, and the venting of the ionization quenching gas terminates after the launch vehicle has accelerated past said given section of the launch tube.

9. The method of claim 1, comprising generating a magnetic force following the launch vehicle as the launch vehicle accelerates through the launch tube, said magnetic force being effective to force any electrical current forming behind the accelerating launch vehicle to move forward and merge with the electrical current conducted through the conductors in the launch tube to the electrical contacts on the launch vehicle.

10. The method of claim 9, wherein the launch tube provides an inductance gradient that exceeds the minimal inductance gradient required for operation of the launch tube.

11. The method of claim 1, comprising a plurality of power sources spaced along the launch tube and configured to separately conduct electrical current to the launch tube only in defined sections of the launch tube, and wherein each of the plurality of power sources is activated for power delivery only during the time that the launch vehicle accelerates past the defined section of the launch tube powered by the respective power source.

12. A launch system comprising:
a launch tube including a power source and conductors configured for conducting electrical current from the power source;
a launch vehicle including a propulsion system configured for accelerating the launch vehicle through the launch tube and electrical contacts configured for transferring the electrical current from the conductors of the launch tube to the propulsion system;
wherein the launch system is configured to substantially prevent flow of electrical current in the launch tube other than between the launch tube conductors and the launch vehicle electrical contacts.

13. The launch system of claim 12, wherein the launch tube comprises a starting end and an exit end, wherein the power source is positioned proximate the exit end of the launch tube and is configured to deliver the electrical current from the exit end toward the starting end, and wherein the launch tube comprises a plurality of elements configured to sequentially terminate delivery of the electrical current rearward of the launch vehicle as the launch vehicle accelerates through the launch tube.

14. The launch system of claim 13, wherein the plurality of elements configured to sequentially terminate delivery of the electrical current rearward of the launch vehicle are selected from the group consisting of solid state switches, explosive switches, fuses, and combinations thereof.

15. The launch system of claim 13, wherein the plurality of elements configured to sequentially terminate delivery of the electrical current rearward of the launch vehicle are defined by one or more of the following configurations: time-based switching; controlled by a defined computer algorithm; mechanically triggered; optically triggered.

16. The launch system of claim 12, comprising a source of an ionization quenching gas and one or more vents configured to emit the ionization quenching gas in a space between the launch tube and the launch vehicle.

17. The launch system of claim 16, wherein the one or more vents are included on the launch vehicle.

18. The launch system of claim 16, wherein the one or more vents are included on the launch tube.

19. The launch system of claim 18, comprising a plurality of the vents positioned along the launch tube and a control element configured to open and close the vents sequentially in combination with passage of the launch vehicle thereby.

20. The launch system of claim 12, wherein the launch tube is configured to have an inductance gradient that exceeds the minimal inductance gradient required for operation of the launch tube.

21. The launch system of claim 12, comprising a plurality of power sources spaced along the launch tube and configured to separately conduct electrical current to the launch tube only in defined sections of the launch tube, and wherein each of the plurality of power sources is configured to be active for power delivery only when the launch vehicle is in the defined section of the launch tube powered by the respective power source.

* * * * *